United States Patent
Asai

(10) Patent No.: US 8,568,006 B2
(45) Date of Patent: Oct. 29, 2013

(54) MIRROR DEVICE FOR VEHICLE

(75) Inventor: Hiroto Asai, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 49 days.

(21) Appl. No.: 13/303,491

(22) Filed: Nov. 23, 2011

(65) Prior Publication Data

US 2012/0134166 A1    May 31, 2012

(30) Foreign Application Priority Data

Nov. 29, 2010  (JP) ................. 2010-265250

(51) Int. Cl.
*B60R 1/12*    (2006.01)
*B60R 1/06*    (2006.01)
*B60Q 1/26*    (2006.01)
*B60Q 1/32*    (2006.01)

(52) U.S. Cl.
USPC ............ 362/494; 362/523; 362/548; 362/549

(58) Field of Classification Search
USPC ................. 362/494, 135, 508, 512, 523, 545, 362/546–549
See application file for complete search history.

(56) References Cited

U.S. PATENT DOCUMENTS

| | | | |
|---|---|---|---|
| 5,669,699 A | | 9/1997 | Pastrick et al. |
| 6,099,153 A | * | 8/2000 | Zimmermann et al. ...... 362/494 |
| 7,387,396 B2 | * | 6/2008 | Kawanishi et al. .......... 362/494 |
| 8,177,400 B2 | * | 5/2012 | Murata ......................... 362/494 |
| 2003/0193814 A1 | | 10/2003 | Bukosky et al. |
| 2004/0190303 A1 | * | 9/2004 | Mishimagi .................... 362/494 |

FOREIGN PATENT DOCUMENTS

| | | |
|---|---|---|
| EP | 0738627 A2 | 10/1996 |
| JP | 2007137125 | 6/2007 |
| JP | 2009046037 | 3/2009 |
| JP | 2011051435 | 3/2011 |

OTHER PUBLICATIONS

European Search Report Application No. 11190881.0-1523 mailed Mar. 20, 2012.

* cited by examiner

*Primary Examiner* — Mariceli Santiago
(74) *Attorney, Agent, or Firm* — Roberts Mlotkowski Safran & Cole P.C.

(57) ABSTRACT

Arrangement accuracy of a transmission member with respect to an exposure hole is increased. In a door mirror device for a vehicle, a turn lamp is assembled to a bracket, a visor rim, and a visor cover, and an exposure portion of a lamp lens of the turn lamp is exposed by an exposure hole of a lower visor cover. As an anchor plate of the lower visor cover is inserted into an anchoring hole of the lamp lens and a fitting column of the lamp lens is inserted into a fitting hole of the lower visor cover, the lamp lens is positioned in the lower visor cover. Therefore, the accuracy precision of the exposure portion with respect to the exposure hole can be increased, thereby enhancing the appearance of a gap between the exposure portion and the periphery of the exposure hole.

6 Claims, 12 Drawing Sheets

MIRROR DEVICE FOR VEHICLE

CROSS-REFERENCE TO RELATED APPLICATION

This application claims priority under 35 USC 119 from Japanese Patent Application No. 2010-265250 filed Nov. 29, 2010, the disclosure of which is incorporated by reference herein.

BACKGROUND

1. Technical Field

The present invention relates to a mirror device for a vehicle in which light transmits a transmission member.

2. Related Art

In an outer mirror of Japanese Patent Application Laid-Open (JP-A) No. 2009-46037, a housing cover is assembled to a housing body, an opening portion is formed in the housing cover, and a lens cover of a turn signal lamp is disposed in the opening portion.

However, in the outer mirror, the lens cover is positioned in the housing body. Therefore, for example, due to assembling error of the housing cover with respect to the housing body, there is a possibility of degrading arrangement accuracy of the lens cover with respect to the opening portion.

SUMMARY OF THE INVENTION

In consideration of the above facts, an object of the present invention is to obtain a mirror device for a vehicle capable of increasing arrangement accuracy of a transmission member with respect to an exposure hole.

A mirror device for a vehicle according to a first aspect of the present invention includes: an accommodation body that accommodates a mirror of a vehicle in a state where a mirror surface of the mirror is exposed; a covering member that is assembled at the accommodation body, is provided with an exposure hole, and covers the accommodation body on a back surface side of the mirror; a transmission member that is positioned at the covering member and is exposed from the exposure hole; and a light-emitting member that is disposed at an inner side of the transmission member, a light emitted by the light-emitting member transmitting through the transmission member.

In the mirror device for a vehicle according to a second aspect of the present invention, in the mirror device for a vehicle according to the first aspect of the present invention, the transmission member is assembled at the accommodation body, an assemble-position of the transmission member with respect to the accommodation body being adjustable.

In the mirror device for a vehicle according to a third aspect of the present invention, in the mirror device for a vehicle according to the first or second aspect of the present invention, the transmission member is assembled at the covering member.

In the mirror device for a vehicle according to a fourth aspect of the present invention, in the mirror device for a vehicle according to any of the first to third aspects of the present invention, the transmission member is positioned at the covering member by the covering member being turned with respect to the accommodation body when the covering member is assembled at the accommodation body.

It is possible that the transmission member is positioned at the covering member by the covering member being turned with respect to the accommodation body when the covering member is assembled at the accommodation body which is in a state where the transmission member is assembled at the accommodation body.

In the above aspect, it is possible that a transmission member side positioning section is provided at the transmission member, and a covering member side positioning section is provided at the covering member; and the transmission member is positioned at the covering member by the transmission member side positioning section and the covering member side positioning section being assembled with each other.

In the above aspect, it is possible that an engaging portion is provided at the covering member, and an engaged portion is provided at the accommodation body; a transmission member side positioning section is provided at the transmission member, and a covering member side positioning section is provided at the covering member; and the transmission member side positioning section and the covering member side positioning section are assembled with each other by the covering member being turned with respect to the accommodation body with the engaged portion as a center of turning in a state where the engaging portion and the engaged portion are engaged.

In the above aspect, it is possible that the transmission member side positioning section includes a first positioned portion and a second positioned portion, and the covering member side positioning section includes a first positioning portion and a second positioning portion; and the transmission member is positioned at the covering member by the first positioned portion and the first positioning portion being assembled with each other and the second positioned portion and the second positioning portion being assembled with each other.

In the mirror device for a vehicle according to the first aspect of the present invention, the covering member is assembled (mounted) to the accommodation body, the accommodation body accommodates the mirror of the vehicle in the state where the mirror surface of the mirror is exposed, and the covering member covers the accommodation body on the back surface side of the mirror.

In addition, the covering member is provided with the exposure hole, the transmission member is exposed from the exposure hole. Moreover, the light-emitting member is disposed inside the transmission member, and the light emitted by the light-emitting member transmits the transmission member.

Here, the transmission member is positioned in the covering member. Therefore, even in a case where an error in assembling the covering member to the accommodation body occurs, arrangement accuracy of the transmission member with respect to the exposure hole can be enhanced.

In the mirror device for a vehicle according to the second aspect of the present invention, the transmission member is assembled to the accommodation body.

Here, the assembling position of the transmission member with respect to the accommodation body is able to be adjusted. Therefore, the transmission member can be appropriately positioned in the covering member.

In the mirror device for a vehicle according to the third aspect of the present invention, the transmission member is assembled to the covering member. Therefore, backlash or looseness of the transmission member in regard to the covering member can be suppressed.

In the mirror device for a vehicle according to the fourth aspect of the present invention, the transmission member is positioned in the covering member by the covering member being turned relative to the accommodation body when the covering member is assembled to the accommodation body. Therefore, the transmission member can be easily positioned in the covering member.

BRIEF DESCRIPTION OF THE DRAWINGS

Embodiments of the present invention will be described in detail with reference to the following figures, wherein.

DETAILED DESCRIPTION OF THE INVENTION

Figure 1:
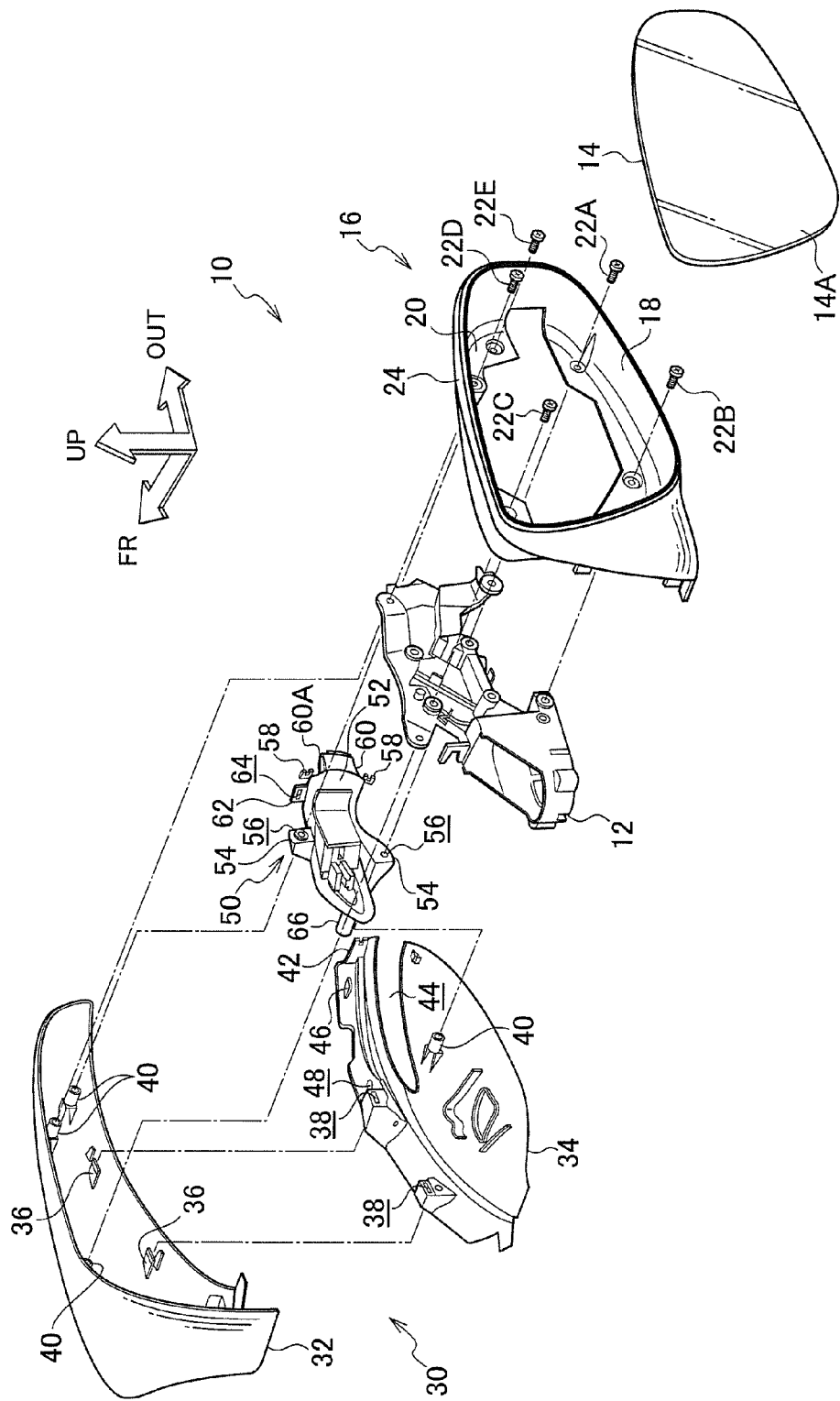
FIG. 1 an exploded perspective view showing a door mirror device for a vehicle according to an embodiment of the present invention as viewed from obliquely above the rear of the vehicle.
Figure 2:
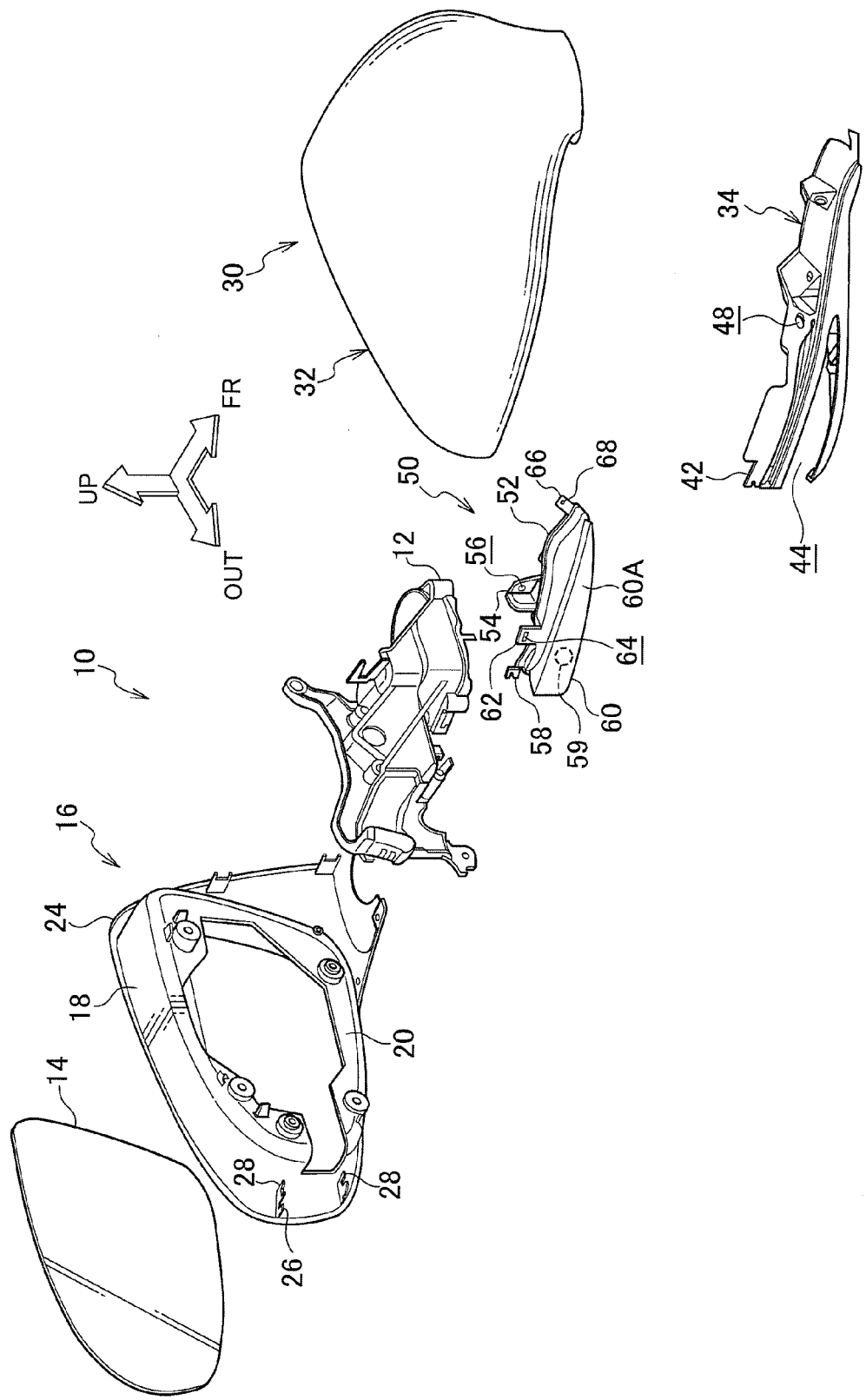
FIG. 2 is an exploded perspective view showing the door mirror device for a vehicle according to the embodiment of the present invention as viewed from obliquely above the front of the vehicle.
Figure 3:
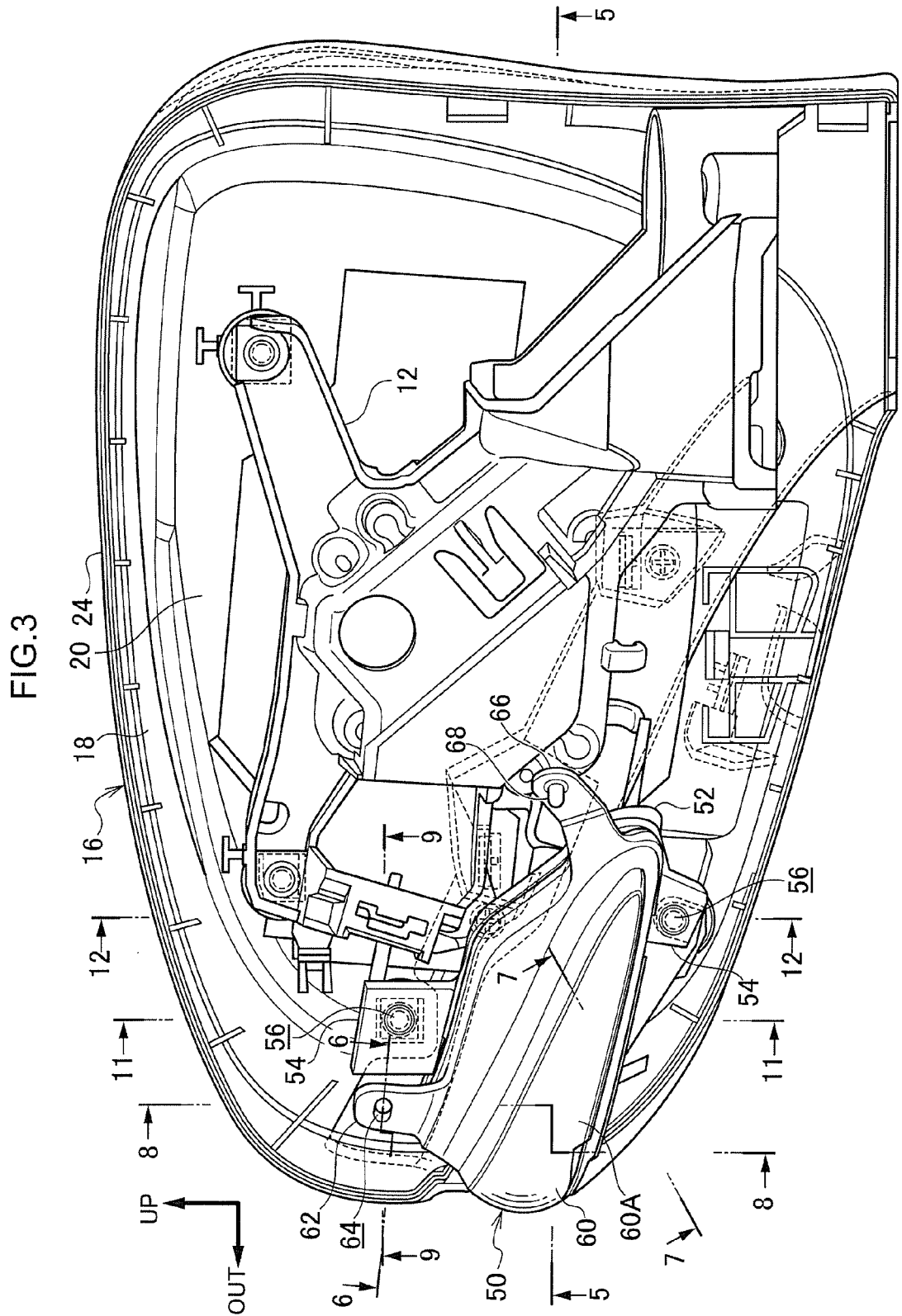
FIG. 3 is a front view showing the main part of the door mirror device for a vehicle according to the embodiment of the present invention as viewed from the front of the vehicle.

In FIG. 1, a door mirror device 10 for a vehicle according to an embodiment to which a mirror device for a vehicle of the present invention is applied is illustrated by an exploded perspective view as viewed from obliquely above the rear of the vehicle, and in FIG. 2, the door mirror device 10 for a vehicle is illustrated by an exploded perspective view as viewed from obliquely above the front of the vehicle. In addition, in FIG. 3, the main part of the door mirror device 10 for a vehicle is illustrated by a front view as viewed from the front of the vehicle, and in FIG. 4, the main part of the door mirror device 10 for a vehicle is illustrated by a plan view as viewed from above. In addition, in the drawings, the front direction of the vehicle is denoted by the arrow FR, the outside direction of the vehicle width direction (the right side of the vehicle) is denoted by the arrow OUT, and the upward direction is denoted by the arrow UP.

The door mirror device 10 for a vehicle according to the embodiment is provided at an outer portion at an intermediate portion in the up and down direction of an end portion on the front side of the vehicle in the door (not shown in the drawings) of the vehicle.

Figure 4:
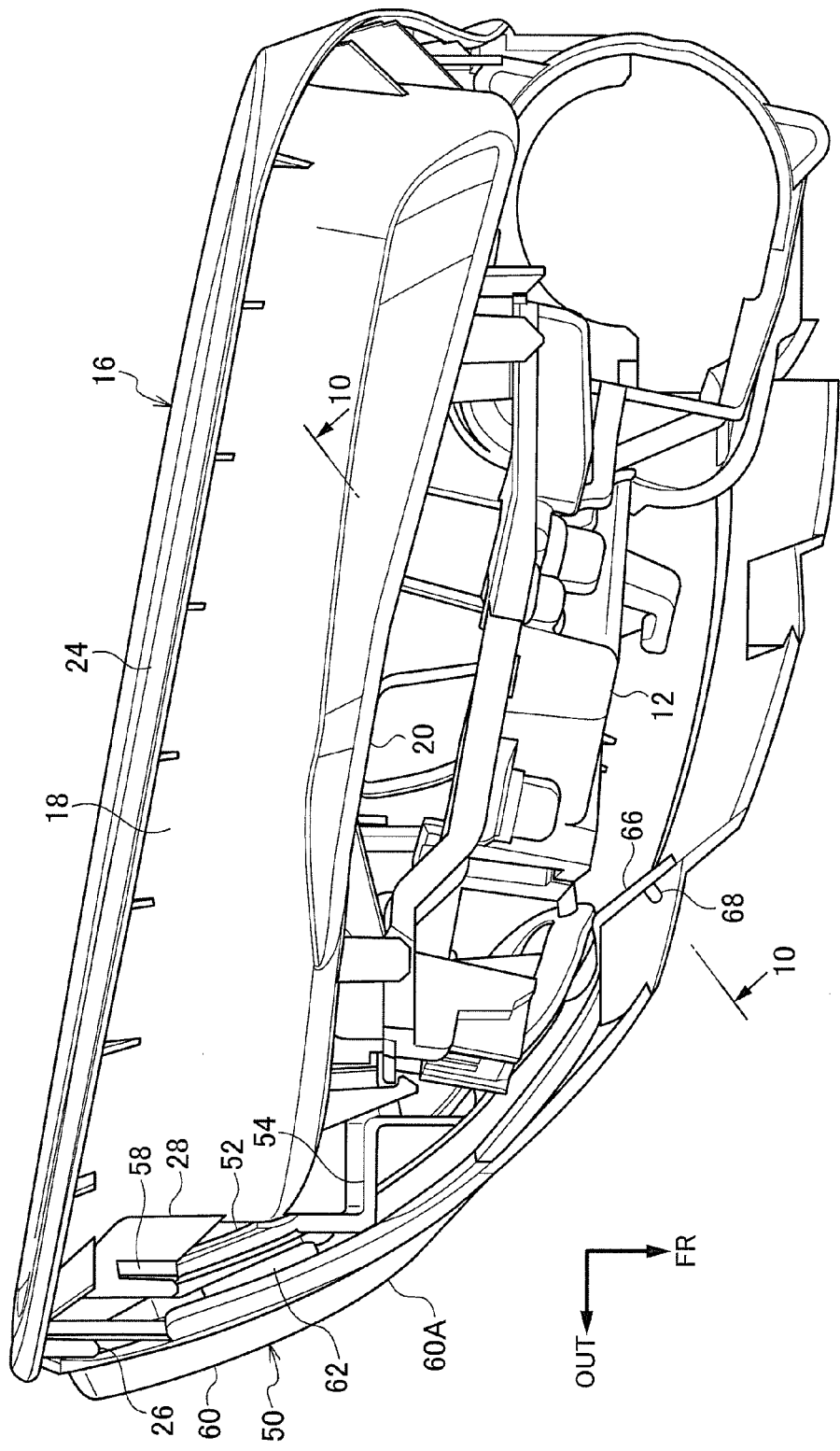
FIG. 4 is a plan view showing the main part of the door mirror device for a vehicle according to the embodiment of the present invention as viewed from above.

As shown in FIGS. 1 and 4, the door mirror device 10 for a vehicle includes a bracket 12 that is made of a resin having a substantial plate shape as a support member structuring an accommodation body, and the bracket 12 is fixed to a housing mechanism (not shown in the drawings) at an inside portion in the vehicle width direction. The housing mechanism is supported by the door of the vehicle, and accordingly, the door mirror device 10 for a vehicle is supported by the door of the vehicle.

On the rear side of the vehicle of the bracket 12, an adjustment mechanism (not shown in the drawings) is fixed, and on the rear side of the vehicle of the adjustment mechanism, a mirror 14 having a substantially rectangular plate shape is assembled such that it is detachable at a back surface side portion. A mirror (finished) surface 14A (front surface) of the mirror 14 faces the rear side of the vehicle and accordingly, the rear side of the vehicle is visible by an occupant (driver or the like) of the vehicle using the mirror 14.

In addition, as the housing mechanism is operated, the mirror 14 is turned (rotated) in the front and rear direction of the vehicle at the inside portion in the vehicle width direction as a center of turn, together with the bracket 12. Therefore, as the mirror 14 is turned to the rear side of the vehicle and to the inside in the vehicle width direction, the mirror 14 is housed. In addition, as the housed mirror 14 is turned to the front side of the vehicle and to the outside in the vehicle width direction, the mirror 14 stands (is returned).

Moreover, as the adjustment mechanism is operated, the mirror 14 is inclined with respect to the bracket 12. Therefore, the angle of the mirror surface 14A of the mirror 14 is adjusted.

On the rear side of the vehicle of the bracket 12, a visor rim 16 that is made of a resin is provided as an accommodation member structuring the accommodation body and a design member, and the visor rim 16 has a low rigidity compared to the bracket 12.

The visor rim 16 is provided with an accommodation cylinder 18 having a substantially rectangular cylinder shape as an accommodation portion, and at a front side end of the vehicle of the accommodation cylinder 18, a bottom wall 20 having a frame plate shape is integrally provided as a penetration portion. The bottom wall 20 is fastened (fixed) to the bracket 12 by plural screws 22A, 22B, 22C, and 22D as a assembling member and accordingly, the visor rim 16 is assembled to the bracket 12. The adjustment mechanism penetrates the inside of the bottom wall 20, and the mirror 14 is accommodated in the accommodation cylinder 18.

A peripheral wall 24 having a substantially J-shaped curved plate shape in a cross-section is provided integrally with the entire outer periphery of the accommodation cylinder 18, as a fitting portion, and the peripheral wall 24 extends from the rear side end of the vehicle of the accommodation cylinder 18 to the front side of the vehicle.

Figure 6:
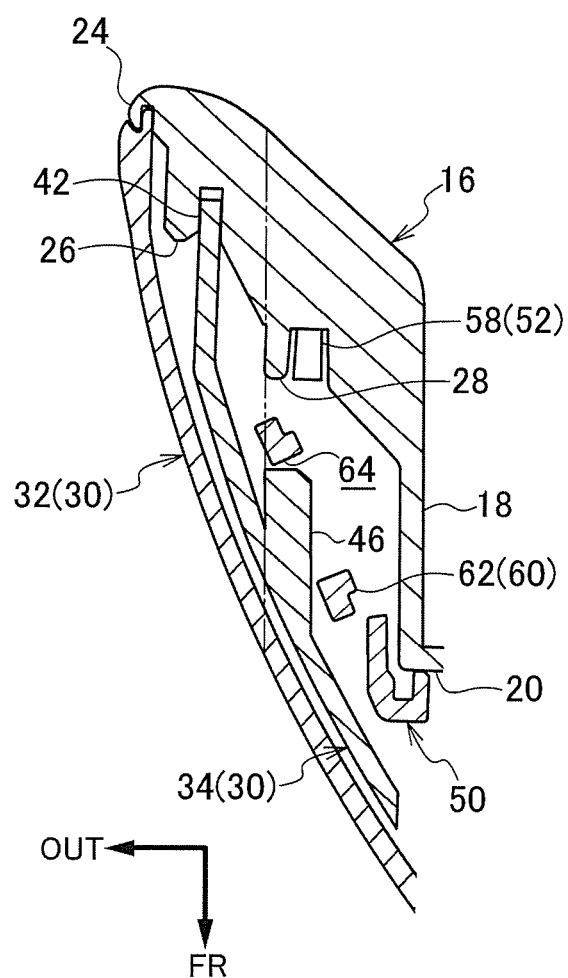
FIG. 6 is a cross-sectional view showing the door mirror device for a vehicle according to the embodiment of the present invention as viewed from above (a cross-sectional view taken along the line 6-6 of FIG. 3)
Figure 7:
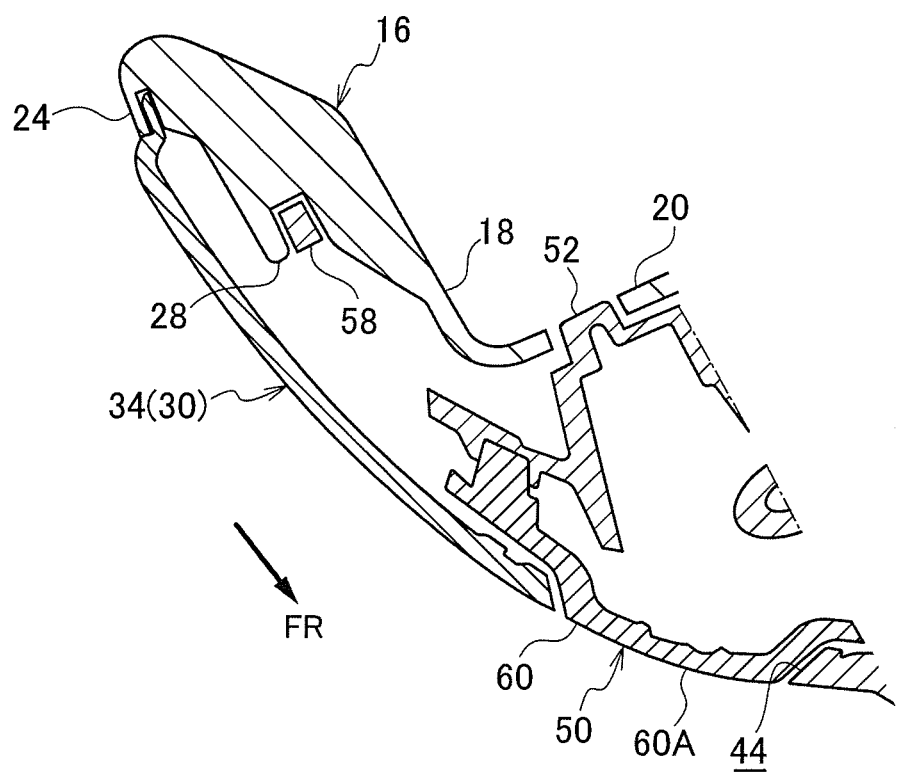
FIG. 7 is a cross-sectional view showing the door mirror device for a vehicle according to the embodiment of the present invention as viewed from obliquely above (a cross-sectional view taken along the line 7-7 of FIG. 3)

An engaged plate 26 having a U-shaped plate shape is integrally provided, as an engaged portion, at an outside end portion in the vehicle width direction at the visor rim 16, and the engaged plate 26 is formed integrally with the peripheral wall 24 and the inner portion thereof is open to the front side of the vehicle (see FIG. 6). Hooked plates 28 having a U-shaped plate shape are provided integrally, as a pair, at the outside end portion in the vehicle width direction at the visor rim 16, and the inside of the hooked plate 28 is open to the front side of the vehicle (see FIGS. 6 and 7). The hooked plate 28 on the upper side is across-disposed between the engaged plate 26 and the accommodation cylinder 18, and the hooked plate 28 on the lower side is across-disposed between the accommodation cylinder 18 and the peripheral wall 24.

On the front side of the vehicle of the bracket 12, a visor cover 30 that is made of a resin having a substantial plate shape is provided as a covering member structuring the design member, and the visor cover 30 has a low rigidity compared to the bracket 12 and is curved into a convex shape to the front side of the vehicle.

The visor cover 30 includes an upper visor cover 32 as a first covering member on the upper side and a lower visor cover 34 as a second covering member on the lower side. A predetermined number of (in this embodiment, 2) engagement claws 36 structuring an engagement portion are provided integrally with the inside surface of the lower end portion of the upper visor cover 32, and a predetermined number of (in this embodiment, 2) engagement holes 38 structuring the engagement portion are formed to penetrate the upper end portion of the lower visor cover 34. The engagement claws 36 are engaged with the engagement holes 38 by temporary elastic deformation, and the lower end portion of the upper visor cover 32 and the upper end portion of the lower visor cover 34 are fitted to each other in a superpose (overlap) state. Accordingly, the upper visor cover 32 and the lower visor cover 34 are assembled with each other.

Plural (in this embodiment, 3 in the upper visor cover 32 and 1 in the lower visor cover 34) assembling cylinders 40 having a cylindrical shape are provided as a fixing portion integrally with the inside surface of the visor cover 30, and the assembling cylinders 40 protrude toward the rear side of the vehicle from the inner surface of the visor cover 30.

At each of the assembling cylinders 40, the upper visor cover 32 is fastened (fixed) to the bracket 12 together with the visor rim 16 by the screws 22C and 22D, and the upper visor cover 32 is fastened (fixed) to the bottom wall 20 of the visor rim 16 by the screw 22E as the assembling member. Moreover, at the assembling cylinder 40, the lower visor cover 34 is fastened (fixed) to the bracket 12 by the screw 22A.

Accordingly, the visor cover 30 is assembled to the bracket 12 and the visor rim 16, and substantially the entire outer periphery of the visor cover 30 is fitted to the peripheral wall 24 of the visor rim 16 in an superpose (overlap) state.

An engagement plate 42 having a U-shaped plate shape is provided integrally at the outside end in the vehicle width direction at the upper end portion of the lower visor cover 34, as an engagement portion, and the inside of the engagement plate 42 is open to the rear side of the vehicle. The engagement plate 42 is engaged with the engaged plate 26 of the visor rim 16. The engaged plate 26 is inserted into the engagement plate 42 and the engagement plate 42 is inserted into the engaged plate 26 (see FIG. 6).

An exposure hole 44 having a long triangular shape is formed to penetrate at the outside portion in the vehicle width direction at the lower visor cover 34, and the exposure hole 44 is open to the outside in the vehicle width direction.

Figure 5:
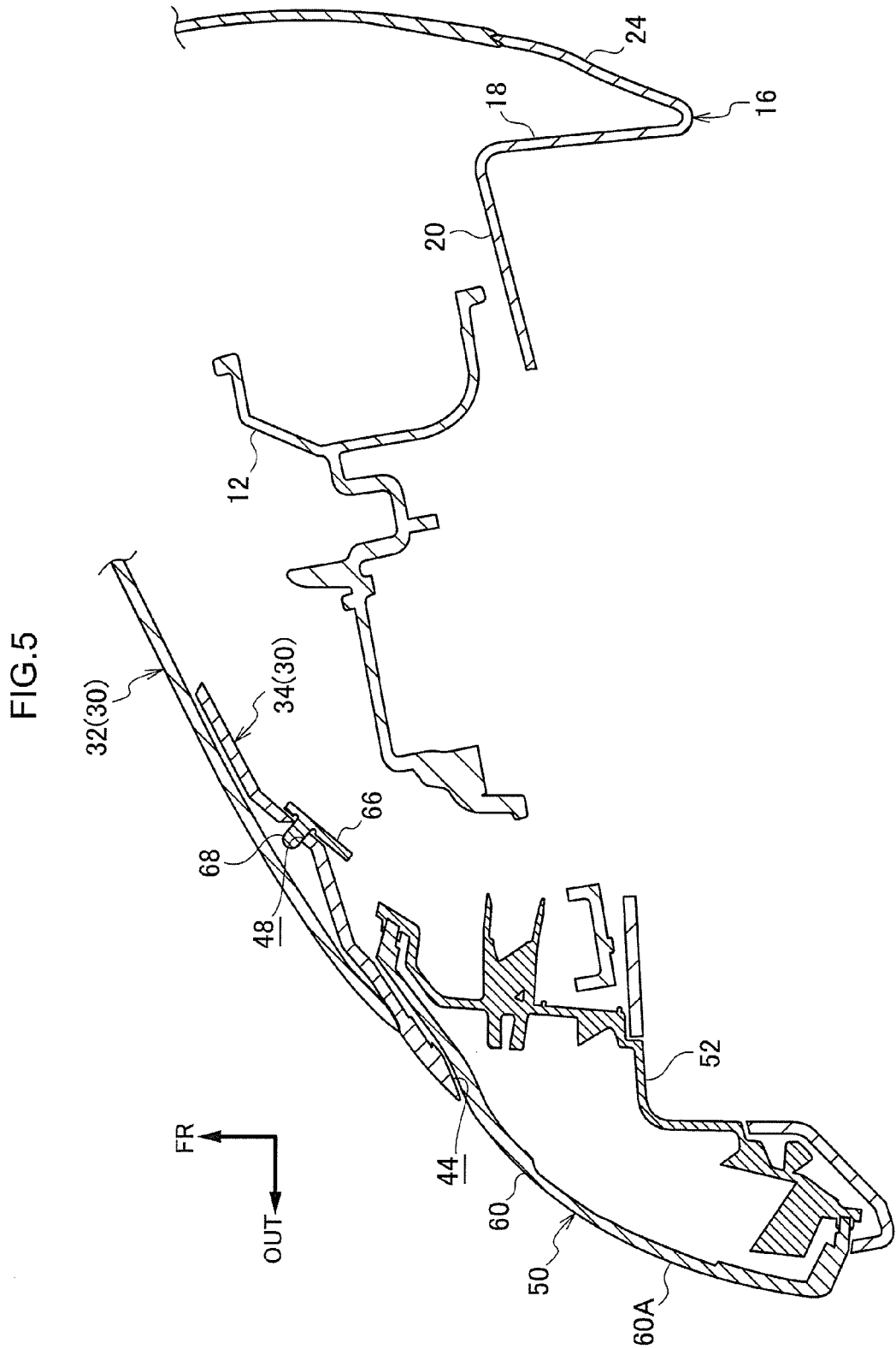
FIG. 5 is a cross-sectional view showing the door mirror device for a vehicle according to the embodiment of the present invention as viewed from below (a cross-sectional view taken along the line 5-5 of FIG. 3)
Figure 8:
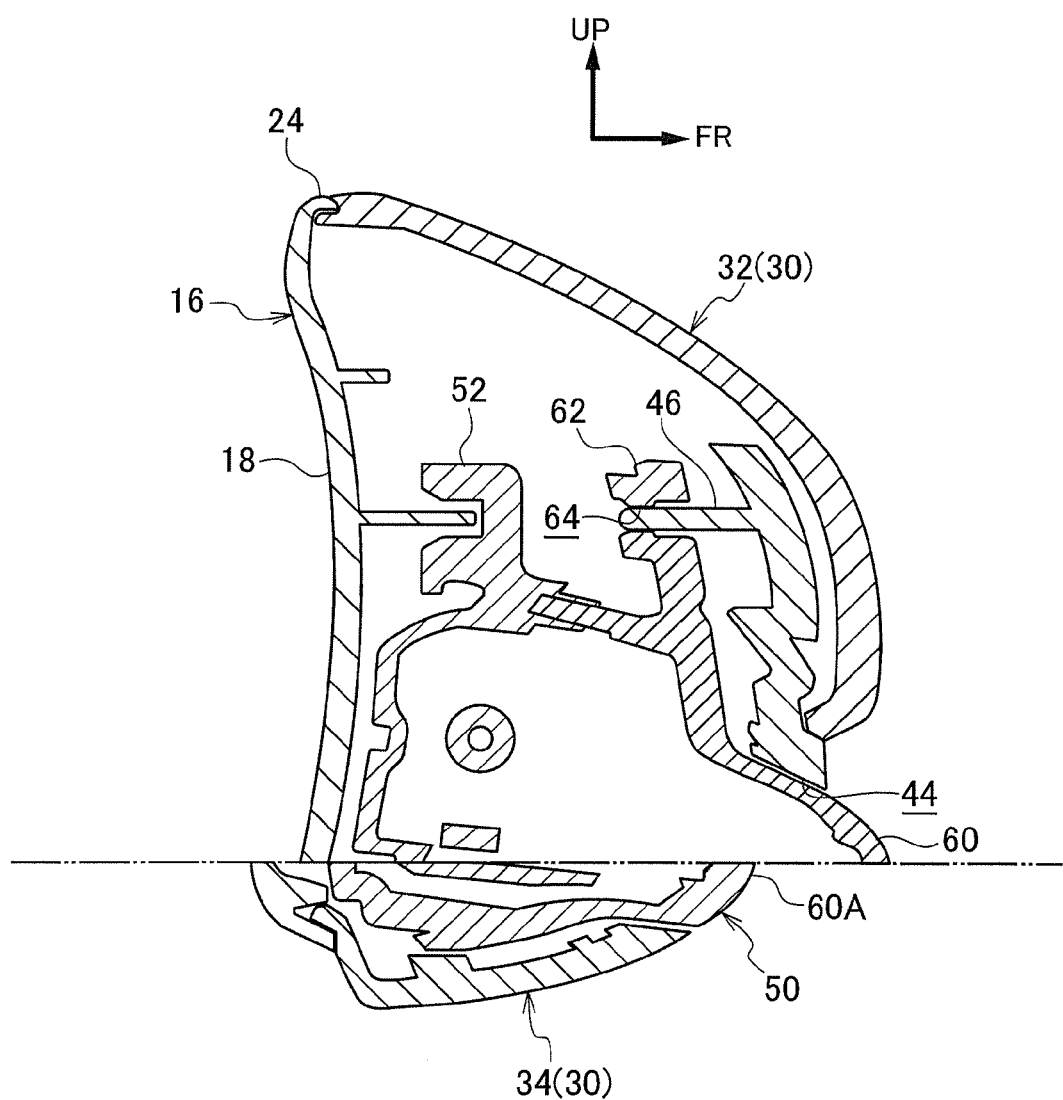
FIG. 8 is a cross-sectional view showing the door mirror device for a vehicle according to the embodiment of the present invention as viewed from outside in a vehicle width direction (a cross-sectional view taken along the line 8-8 of FIG. 3)
Figure 9:
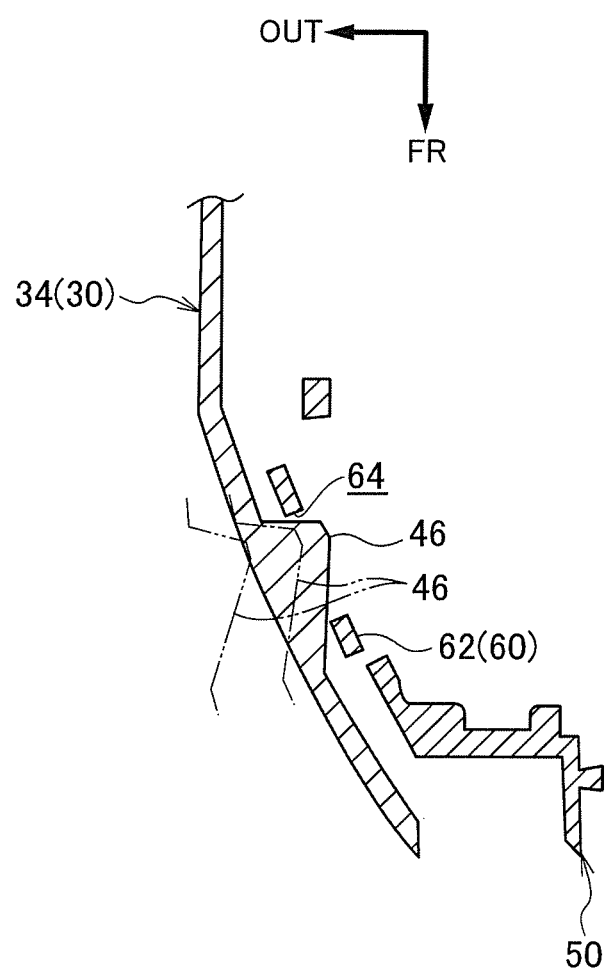
FIG. 9 is a cross-sectional view showing the door mirror device for a vehicle according to the embodiment of the present invention as viewed from below (a cross-sectional view taken along the line 9-9 of FIG. 3)
Figure 10:
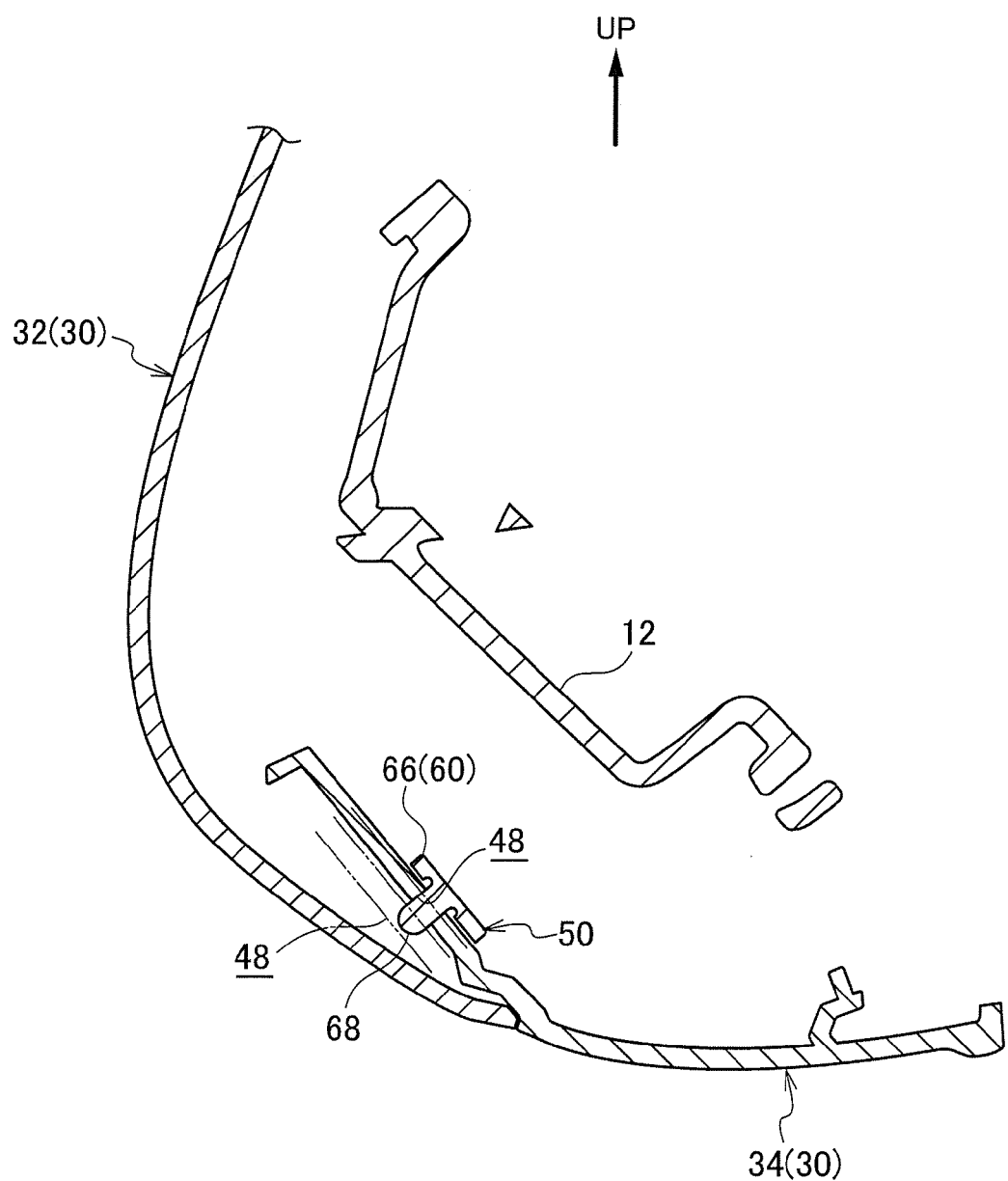
FIG. 10 is a cross-sectional view showing the door mirror device for a vehicle according to the embodiment of the present invention as viewed from obliquely in front of the vehicle (a cross-sectional view taken along the line 10-10 of FIG. 4)

A anchor plate 46 having a substantially triangular plate shape (for example, a trapezoidal plate shape) as a first positioning portion structuring a positioning section is provided integrally at the inside surface of the upper end portion of the lower visor cover 34 at the outside portion in the vehicle width direction thereof, and the anchor plate 46 protrudes toward the rear side of the vehicle from the lower visor cover 34 (see FIGS. 6, 8, and 9). Moreover, a fitting hole 48 having a circular shape as a second positioning portion structuring the positioning section is formed to penetrate the upper end portion of the lower visor cover 34 at the intermediate portion in the vehicle width direction (see FIGS. 5 and 10).

A turn lamp 50 as a light-emitting mechanism is provided between the bracket 12 and the visor cover 30.

In the turn lamp 50, a lamp body 52 that is made of a resin as a body member having a substantially U-shaped long plate shape in a cross-section is provided at the rear side portion of the vehicle, and the lamp body 52 has a high rigidity compared to the visor rim 16 and the visor cover 30.

Assembling plates 54 having flat plate shape as a assembling portion are provided integrally with the upper portion and the lower portion of the lamp body 52, respectively, and an adjustment hole 56 having a circular shape as an adjustment portion is provided to penetrate the assembling plate 54.

Figure 11:
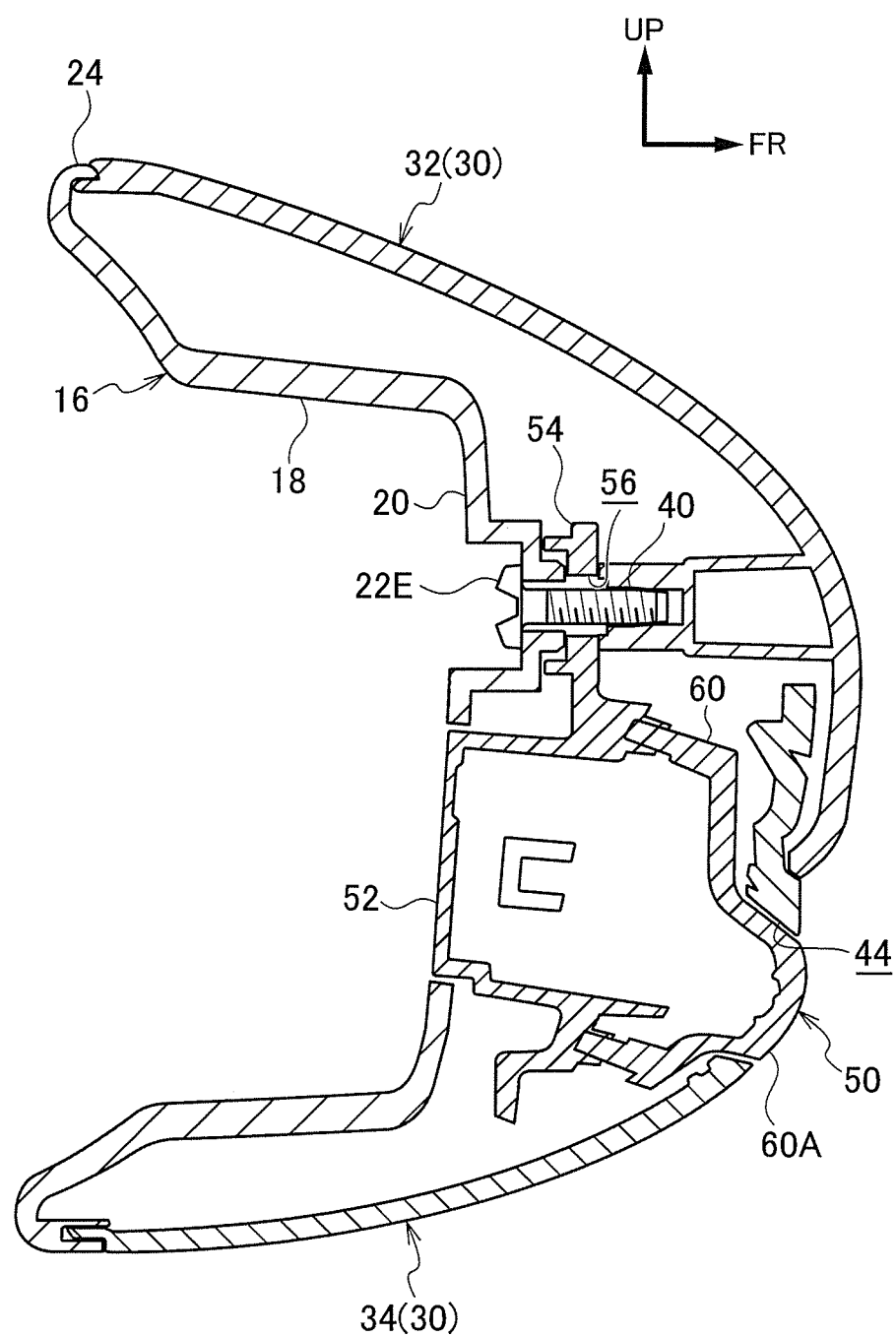
FIG. 11 is a cross-sectional view showing the door mirror device for a vehicle according to the embodiment of the present invention as viewed from outside in the vehicle width direction (a cross-sectional view taken along the line 11-11 of FIG. 3)
Figure 12:
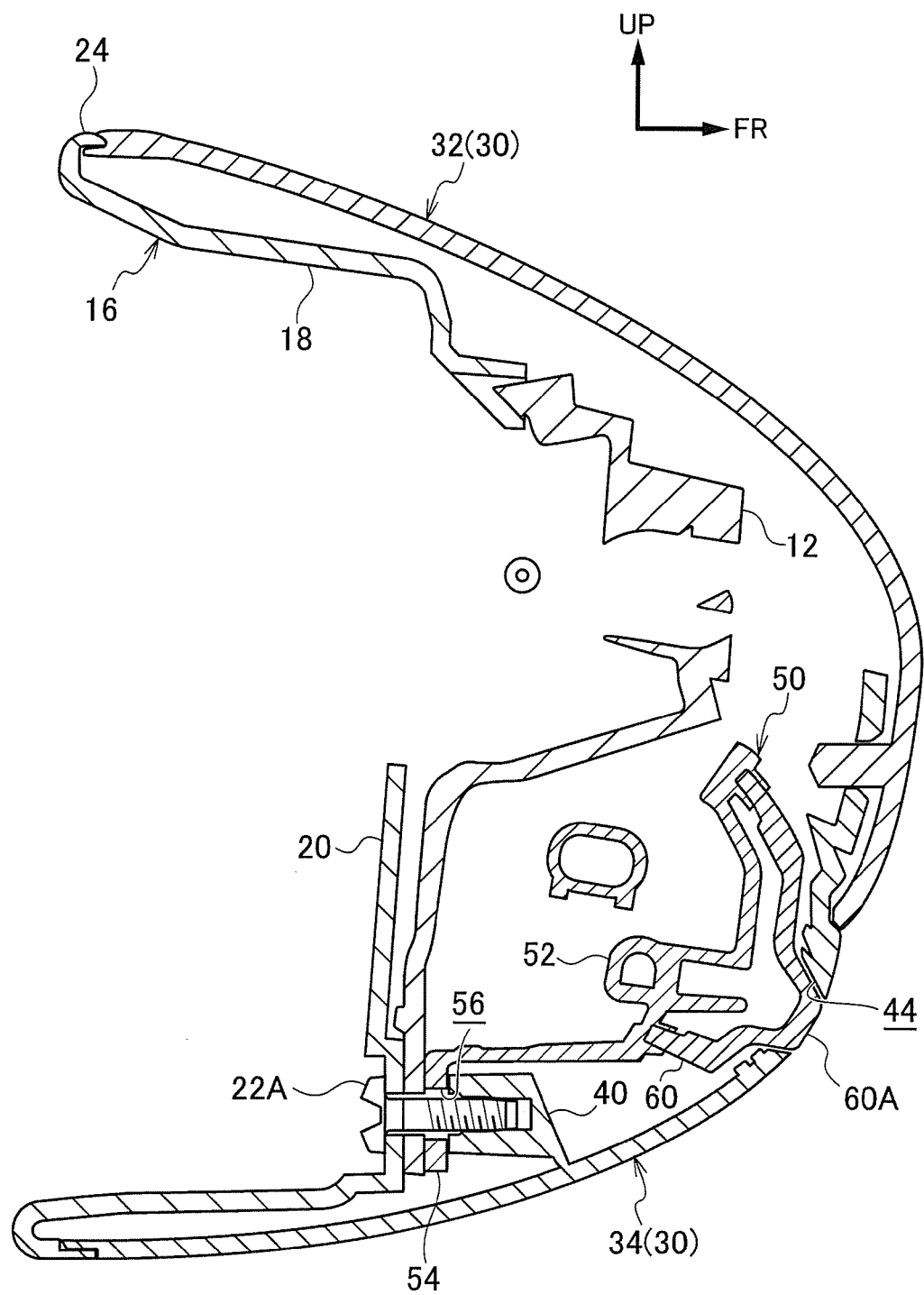
FIG. 12 is a cross-sectional view showing the door mirror device for a vehicle according to the embodiment of the present invention as viewed from outside in the vehicle width direction (a cross-sectional view taken along the line 12-12 of FIG. 3).

The screw 22E penetrates the adjustment hole 56 of the assembling plate 54 on the upper side, and the assembling plate 54 on the upper side is interposed (sandwiched) between the bottom wall 20 of the visor rim 16 and the assembling cylinder 40 of the upper visor cover 32 and is assembled to the visor rim 16 and the upper visor cover 32 (see FIG. 11). The screw 22A penetrates the adjustment hole 56 of the assembling plate 54 on the lower side, and the assembling plate 54 on the lower side is interposed (sandwiched) between the bracket 12 and the assembling cylinder 40 of the lower visor cover 34 and is assembled to the bracket 12, the visor rim 16, and the lower visor cover 34 (see FIG. 12). Accordingly, the turn lamp 50 is assembled to the bracket 12, the visor rim 16, and the visor cover 30.

The adjustment hole 56 of the assembling plate 54 on the upper side is large compared to the diameter of the penetration portion of the screw 22E, so that the position of the assembling plate 54 on the upper side with respect to the screw 22E can be adjusted. The adjustment hole 56 of the assembling plate 54 on the lower side is large compared to the diameter of the penetration portion of the screw 22A, so that the position of the assembling plate 54 on the lower side with respect to the screw 22A can be adjusted. Accordingly, the position of the turn lamp 50 with respect to the bracket 12, the visor rim 16, and the visor cover 30 can be adjusted.

Hooking plates 58 having a U-shaped plate shape are provided integrally at the upper and lower portions of the outside end portion in the vehicle width direction at the lamp body 52, and the inside of the hooking plate 58 is open to the rear side of the vehicle. The hooking plate 58 hooks each of the hooked plates 28 of the visor rim 16. The hooked plate 28 is inserted into the hooking plate 58 and the hooking plate 58 is inserted into the hooked plate 28 (see FIGS. 6 and 7).

A lamp lens 60 which is made of a resin having a substantially U-shaped long plate shape in a cross-section as a transmission member structuring the design member is provided on the front side of the vehicle of the lamp body 52, and the lamp lens 60 has a low rigidity compared to the lamp body 52 and the bracket 12. The entire periphery of the lamp lens 60 is welded to the entire periphery of the lamp body 52, and accordingly, the lamp lens 60 is fixed to the lamp body 52. In addition, the lamp lens 60 is configured of a transparent material to be able to transmit light.

An anchored plate 62 having a substantially rectangular plate shape is provided integrally at the upper end portion of the lamp lens 60 at the outside portion in the vehicle width direction, and a long anchoring hole 64 as a first positioned portion structuring the positioning section is formed to penetrate the anchored plate 62 (see FIGS. 6, 8, and 9). Moreover, an installation plate 66 having a long plate shape is provided integrally at the upper end portion of the lamp lens 60 at the inside end portion in the vehicle width direction, and a fitting column 68 having a substantially columnar (circular cylinder) shape as a second positioned member structuring the positioning section is provided integrally with the installation plate 66 (see FIGS. 5 and 10). The fitting column 68 protrudes from the installation plate 66 in a tangential direction of a circle with the engaged plate 26 of the visor rim 16 as its center, and a tip end surface of the fitting column 68 is curved in a hemispherical surface shape.

The anchor plate 46 of the lower visor cover 34 is inserted into the anchoring hole 64 of the anchored plate 62, and the anchor plate 46 is fitted into the anchoring hole 64 in the up and down direction (see FIGS. 6, 8, and 9). Moreover, the fitting column 68 of the installation plate 66 is inserted into the fitting hole 48 of the lower visor cover 34, and the fitting column 68 is fitted to the fitting hole 48 along the entire periphery. Namely, the positioning section at the lamp lens 60 side and the positioning section at the lower visor cover 34 side are assembled (matched) each other. Therefore, sliding of the lamp lens 60 with respect to the lower visor cover 34 in both the vehicle width directions and the up and down directions is stopped by the insertion of the fitting column 68 into the fitting hole 48, and rotation of the lamp lens 60 with respect to the lower visor cover 34 around the fitting column 68 as the center in both sides of the peripheral direction is stopped by the insertion of the anchor plate 46 into the anchoring hole 64. Accordingly, in the lamp lens 60, the turn lamp 50 is positioned at the lower visor cover 34.

An exposure portion 60A having a long rectangular shape in a front view and a substantially U shape in a cross-section is formed in the lamp lens 60, and the exposure portion 60A protrudes more toward the front side of the vehicle than the other parts of the lamp lens 60. The exposure portion 60A is inserted into the exposure hole 44 of the lower visor cover 34 and is exposed to the outside of the lower visor cover 34, and a gap is formed between the exposure portion 60A and the entire periphery of the exposure hole 44 (see FIGS. 5, 7, 8, 11, and 12).

In the turn lamp 50, a lamp 59 as a light-emitting member is provided between the lamp body 52 and the lamp lens 60, and the lamp 59 is held by the lamp body 52. Wiring of the turn lamp 50 (wiring of the lamp) passes through the bracket 12 and is electrically connected to a control device (not shown in the drawings) of the vehicle, so that when the vehicle occupant changes a travelling direction of the vehicle or the like, as the occupant performs a predetermined operation, the lamp 59 emits light in turned on and off manner (flashing) under the control of the control device. Therefore, as the light emitted by the lamp 59 transmits the lamp lens 60 and is emitted to the outside of the lamp lens 60, the turn lamp 50 (the exposure portion 60A of the lamp lens 60) flashing.

Next, operations of the embodiment will be described.

In the door mirror device 10 for a vehicle having the above configuration, the bracket 12, the visor rim 16 (the bottom wall 20), and the visor cover 30 (the assembling cylinders 40 of the upper visor cover 32 and the lower visor cover 34) are assembled by the screws 22A, 22B, 22C, 22D, and 22E.

In addition, the turn lamp 50 (the pair of assembling plates 54 of the lamp body 52) is assembled to the bracket 12, the visor rim 16 (the bottom wall 20), and the visor cover 30 (the assembling cylinders 40 of the upper visor cover 32 and the lower visor cover 34) by the screws 22A and 22 E.

Moreover, the exposure portion 60A of the lamp lens 60 of the turn lamp 50 is exposed by the exposure hole 44 of the lower visor cover 34, the gap is formed between the exposure portion 60A and the entire periphery of the exposure hole 44.

Here, as the anchor plate 46 of the lower visor cover 34 is inserted to the anchoring hole 64 of the lamp lens 60 (the anchored plate 62) and the fitting column 68 of the lamp lens 60 (the installation plate 66) is inserted into the fitting hole 48 of the lower visor cover 34, the lamp lens 60 is positioned with respect to the lower visor cover 34.

Therefore, even if an error in assembling the lower visor cover 34 with respect to the bracket 12 and the visor rim 16 occurs or an error in fixing the lamp lens 60 with respect to the lamp body 52 occurs, arrangement accuracy of the exposure portion 60A of the lamp lens 60 with respect to the exposure hole 44 of the lower visor cover 34 can be increased. Accordingly, the width dimension of the gap between the exposure portion 60A and the entire periphery of the exposure hole 44 can be made uniform along the entire longitudinal direction of the gap, thereby enhancing the appearance of the gap.

Moreover, the adjustment holes 56 of the respective assembling plates 54 of the lamp body 52 are large compared to the diameters of the penetration portions of the corresponding screws 22A and 22E respectively, and the positions of the assembling plates 54 with respect to the corresponding screws 22A and 22E can be adjusted, so that the assembling position of the turn lamp 50 (the lamp body 52 and the lamp lens 60) with respect to the bracket 12 and the visor rim 16 can be adjusted.

Therefore, even if an error in assembling the lower visor cover 34 to the bracket 12 and the visor rim 16 occurs or an error in fixing the lamp lens 60 to the lamp body 52 occurs, by adjusting the assembling position of the turn lamp 50 (the lamp body 52 and the lamp lens 60) with respect to the bracket 12 and the visor rim 16, the anchor plate 46 of the lower visor cover 34 can be appropriately inserted into the anchoring hole 64 of the lamp lens 60 (the anchored plate 62), and the fitting column 68 of the lamp lens 60 (the installation plate 66) can be appropriately inserted into the fitting hole 48 of the lower visor cover 34. Accordingly, the lamp lens 60 can be appropriately positioned in the lower visor cover 34.

Moreover, as described above, the turn lamp 50 is assembled not only to the visor cover 30 having a relatively low rigidity but also to the bracket 12 and the visor rim 16. Therefore, different from a case where the turn lamp 50 is assembled only to the visor cover 30, deformation of the visor cover 30 due to assembling of the turn lamp 50 to the visor cover 30 can be suppressed, and the position deviation of the turn lamp 50 with respect to the visor cover 30 due to an impact on the turn lamp 50 or the visor cover 30 can be suppressed. Accordingly, positioning accuracy of the lamp lens 60 with respect to the lower visor cover 34 can be increased, thereby further enhancing the arrangement accuracy of the exposure portion 60A of the lamp lens 60 with respect to the exposure hole 44 of the lower visor cover 34.

Moreover, as described above, the turn lamp 50 is assembled to the visor cover 30. Therefore, backlash or looseness of the turn lamp 50 in regard to the visor cover 30 can be suppressed.

In addition, the anchor plate 46 of the lower visor cover 34 has a substantially triangular plate shape. Moreover, the fitting column 68 of the lamp lens 60 (the installation plate 66)

has its axial direction which is the tangential direction of a circle with the engaged plate 26 of the visor rim 16 as its center, and the front end surface of the fitting column 68 is curved so as to have a hemispherical surface shape. Therefore, when the lower visor cover 34 is assembled to the bracket 12, the visor rim 16, and the turn lamp 50 in an assembly state, by that the lower visor cover 34 is turned around the engaged plate 26 as a center in a state where the engagement plate 42 of the lower visor cover 34 is engaged with the engaged plate 26 of the visor rim 16, the anchor plate 46 of the lower visor cover 34 is inserted into the anchoring hole 64 of the lamp lens 60 (the anchored plate 62) (see the double-dot-dashed line of FIG. 9), and also the fitting column 68 of the lamp lens 60 (the installation plate 66) is inserted into the fitting hole 48 of the lower visor cover 34 (see the double-dot-dashed line of FIG. 10). Therefore, the lamp lens 60 can be easily positioned in the lower visor cover 34.

Moreover, as described above, the turn lamp 50 is assembled to the bracket 12. Therefore, different from the case where the visor cover 30 to which the turn lamp 50 is assembled is assembled to the bracket 12, when the visor cover 30 is assembled to the bracket 12, it is not necessary that the turn lamp 50 is moved with respect to the bracket 12. Accordingly, the need to make long the length of wiring between the turn lamp 50 and the bracket 12 in order to allow movement of the turn lamp 50 with respect to the bracket 12 can be eliminated. Therefore, occurring of sag or slack of the wiring between the turn lamp 50 and the bracket 12 when the turn lamp 50 is assembled to the bracket 12 can be suppressed, so that, for example, abnormal noise that is generated due to vibration of the wiring during driving of the vehicle can be suppressed.

In addition, in this embodiment, the turn lamp 50 is assembled to the bracket 12 and the visor rim 16. However, the turn lamp 50 may be assembled to one of the bracket 12 or the visor rim 16.

In addition, in this embodiment, the visor cover 30 is assembled to the bracket 12 and the visor rim 16. However, the visor cover 30 may be assembled to one of the bracket 12 or the visor rim 16.

Moreover, in this embodiment, the visor cover 30 is constituted by the upper visor cover 32 and the lower visor cover 34. However, the visor cover 30 may be configured of a single body component.

In addition, in this embodiment, the mirror device for a vehicle of the present invention is applied to the door mirror device 10 for a vehicle. However, the mirror device for a vehicle of the present invention may also be applied to a different outer mirror device for a vehicle outside the vehicle (for example, a fender mirror device for a vehicle) or an inner mirror device for a vehicle inside the vehicle.

What is claimed is:

1. A mirror device for a vehicle, comprising: an accommodation body that accommodates a mirror of a vehicle in a state where a mirror surface of the mirror is exposed; a covering member that is assembled at the accommodation body, is provided with an exposure hole, and covers the accommodation body on a back surface side of the mirror; a transmission member that is positioned at the covering member and is exposed from the exposure hole; and a light-emitting member that is disposed at an inner side of the transmission member, a light emitted by the light-emitting member transmitting through the transmission member, wherein the transmission member is assembled at the accommodation body, an assemble-position of the transmission member with respect to the accommodation body being adjustable, and wherein the transmission member is assembled at the covering member such that the position of the transmission member relative to the exposure hole in the covering member is affixed.

2. The mirror device for a vehicle of claim 1, wherein: a transmission member side positioning section is provided at the transmission member, and a covering member side positioning section is provided at the covering member; and the transmission member is positioned at the covering member by the transmission member side positioning section and the covering member side positioning section being assembled with each other.

3. The mirror device for a vehicle of claim 1, wherein: an engaging portion is provided at the covering member, and an engaged portion is provided at the accommodation body; a transmission member side positioning section is provided at the transmission member, and a covering member side positioning section is provided at the covering member.

4. The mirror device for a vehicle of claim 2, wherein: the transmission member side positioning section includes a first positioned portion and a second positioned portion, and the covering member side positioning section includes a first positioning portion and a second positioning portion; and the transmission member is positioned at the covering member by the first positioned portion and the first positioning portion being assembled with each other and the second positioned portion and the second positioning portion being assembled with each other.

5. The mirror device for a vehicle of claim 1, wherein: the covering member and the accommodation body are assembled by an assembling member, an adjustment hole is formed at the transmission member, and the assembling member penetrates through the adjustment hole, and a dimension of the adjustment hole is formed so as to be larger than a dimension of a penetration portion of the assembling member.

6. A mirror device for a vehicle, comprising:
an accommodation body that accommodates a mirror of a vehicle in a state where a mirror surface of the mirror is exposed;
a covering member that is assembled at the accommodation body, is provided with an exposure hole, and covers the accommodation body on a back surface side of the mirror;
a transmission member that is positioned at the covering member, the transmission member including an exposure portion which is exposed from the exposure hole; and
a light-emitting member that is disposed at an inner side of the transmission member, a light emitted by the light-emitting member transmitting through the transmission member,
wherein the transmission member is fixedly positioned to the covering member such that a gap is formed between an entire peripheral edge portion of the exposure hole and the exposure portion.

* * * * *